United States Patent [19]
You et al.

[11] Patent Number: 6,160,936
[45] Date of Patent: *Dec. 12, 2000

[54] APPARATUS AND METHOD FOR COMBINING OPTICAL WAVEGUIDE AND OPTICAL FIBER

[75] Inventors: Byong-gwon You, Daejeon; Hyung-jae Lee, Seoul; Tae-hyung Rhee, Sungnam; Yong-woo Lee, Yongin, all of Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,497

[22] Filed: Jan. 29, 1998

[30] Foreign Application Priority Data

Jan. 19, 1997 [KR] Rep. of Korea .......................... 97-2665

[51] Int. Cl.[7] .................................................. G02B 6/30
[52] U.S. Cl. ............................................... 385/49; 385/52
[58] Field of Search .................................. 385/49, 50, 52

[56] References Cited

U.S. PATENT DOCUMENTS

| 5,545,594 | 8/1996 | Cahill ........................................ 437/228 |
| 5,703,973 | 12/1997 | Mettler et al. ............................. 385/49 |

FOREIGN PATENT DOCUMENTS

| 4-340507 | 11/1992 | Japan ........................................ 385/49 |
| 7-151940 | 6/1995 | Japan . | |
| 2195785 | 4/1988 | United Kingdom ..................... 385/49 |

*Primary Examiner*—John D. Lee
*Assistant Examiner*—Michelle R. Connelly-Cushwa
*Attorney, Agent, or Firm*—Robert E. Bushnell, Esq.

[57] ABSTRACT

An apparatus and a method for combining an optical waveguide and optical fibers are provided. The apparatus includes an apparatus for combining optical fibers with an optical waveguide device, including a guide rail portion for alignment including guide rails for alignment spaced apart from each other by a predetermined distance, on a flat substrate, an optical fiber array portion put on the guide rail portion for alignment when the optical fibers are combined with the optical waveguide device, including an array of grooves for arranging the optical fibers spaced apart from each other by a predetermined distance in an array pattern, and including guide grooves for alignment having a concavo-convex relationship with the guide rail portion for alignment, and an optical waveguide device chip put on the guide rail portion when the optical fibers are combined with the optical waveguide, including the optical waveguide connected to the optical fibers of the optical fiber array portion, and including guide grooves for alignment spaced apart from each other by the same distance as that by which the rails of the guide rail portion are spaced apart from each other and having a concavo-convex relationship with the guide rail portion for alignment, to the outside of an optical waveguide area in which the cores of the optical fibers of the optical fiber array portion respectively coincide with those of the optical waveguide. According to the present invention, a light source and a photodetector (required for active alignment) are not necessary. A complicated alignment process of performing an alignment with respect to an alignment axis having six degrees of freedom with submicron precision is not necessary. Also, it is possible to save time and money when attaching the optical fibers to the optical waveguide device chip.

21 Claims, 6 Drawing Sheets

APPARATUS AND METHOD FOR COMBINING OPTICAL WAVEGUIDE AND OPTICAL FIBER

BACKGROUND OF THE INVENTION

1. Field of the Invention

The present invention relates to an apparatus and a method for combining an optical waveguide and optical fibers, and more particularly, to an apparatus for combining manually aligned optical fibers with an input and output optical waveguide of an integrated optical device manufactured by integrating an optical waveguide device having various functions with a substrate and a method therefor.

2. Description of the Related Art

In general, there are two methods for attaching optical fibers to an optical waveguide device. In a method referred to as an active alignment method, input light is guided to optical fibers or an element, the position of the optical fibers is precisely controlled, optical power in an optical waveguide or in an output waveguide of the optical fibers is measured, and the optical fibers and the optical waveguide are fixed in a state in which the combination of the optical fibers with the optical waveguide maximizes light transmission. In a passive alignment method, precise alignment of the optical fibers and the optical waveguide is automatically performed by the shape and structure of the combined portion, without guiding light when the optical fibers are combined with the optical waveguide.

The active alignment method is practical for combining the optical fibers with the optical waveguide. In the active alignment method, a light source and a photodetector are required for aligning the optical fibers and the optical waveguide. It is difficult and takes a long time to align the optical fibers and the optical waveguide, since the alignment must be performed with respect to an alignment axis having six degrees of freedom (it must be rotated with respect to three straight axes perpendicular to each other and three straight axes) with submicron precision.

SUMMARY OF THE INVENTION

To solve the above problem(s), it is an objective of the present invention to provide an apparatus for easily combining optical fibers with an optical waveguide by a passive alignment method using a guide rail in order to save time and money when attaching the optical fibers to an optical waveguide device chip.

It is another objective of the present invention to provide a method therefor.

To achieve the first objective, there is provided an apparatus for combining optical fibers with an optical waveguide device, comprising a guide rail portion for alignment including guide rails for alignment spaced apart from each other by a predetermined distance, on a flat substrate, an optical fiber array portion put on the guide rail portion for alignment when the optical fibers are combined with the optical waveguide device, including an array of grooves for arranging the optical fibers spaced apart from each other by a predetermined distance in an array pattern, and including guide grooves for alignment having a concavo-convex relationship with the guide rail portion for alignment, and an optical waveguide device chip put on the guide rail portion when the optical fibers are combined with the optical waveguide, including the optical waveguide connected to the optical fibers of the optical fiber array portion, and including guide grooves for alignment spaced apart from each other by the same distance as that by which the rails of the guide rail portion are spaced apart from each other and having a concavo-convex relationship with the guide rail portion for alignment, to the outside of an optical waveguide area in which the cores of the optical fibers of the optical fiber array portion respectively coincide with those of the optical waveguide.

The guide rail portion for alignment comprises two guide rails spaced apart from each other by a certain distance, manufactured to be convex, on a plane. The shape of the section of the guide rail is one selected from among a triangle, a square, a semi-circle, and a trapezoid.

The guide rail of the guide rail portion for alignment, the guide grooves of the optical fiber array portion, and the guide grooves of the optical waveguide device chip are manufactured by a method selected from among etching a silicon substrate, a precise mechanical process, and a precise molding. The optical fibers are fixed to the groove array of the optical fiber array portion by putting the optical fibers on the groove array, coating an optical glue thereon, and covering the glue and optical fibers with a plate for fixing the optical fibers.

Also, the guide grooves for alignment of the optical waveguide device chip are manufactured in a longitudinal direction over some part or all of the optical waveguide device chip on the optical waveguide device chip. The optical waveguide device chip is manufactured of a material selected from among the group consisting of a silica optical waveguide, a polymer optical waveguide, a glass optical waveguide, and a lithium niobate ($LiNbO_3$) optical waveguide.

In the guide rail portion for alignment, the lateral positions of the cores of the optical fibers and the optical waveguide are aligned by the positions of the optical fiber array portion and the guide grooves on the optical waveguide device chip in relation to the optical fibers and the optical waveguide when the optical fiber array portion is combined with the optical waveguide device chip on the guide rails for alignment. The vertical positions of the cores of the optical fibers of the optical fiber array portion and the cores of the optical waveguide of the optical waveguide device chip are aligned by controlling the depth of the guide grooves for alignment when the optical fiber array portion is combined with the optical waveguide device chip on the guide rails for alignment.

The optical fiber array portion and the optical waveguide device chip, combined with each other on the guide rail of the guide rail portion for alignment, are fixed together by an optical glue or by welding. The section of the guide rail of the guide rail portion for alignment is combined with the guide groove on the optical fiber array portion and the optical waveguide device chip in a state in which the guide rail and the guide groove have the same concavo-convex shape or different concavo-convex shape.

To achieve the second objective, there is provided a method for combining optical fibers with an optical waveguide, comprising the steps of manufacturing guide rails for alignment spaced apart from each other by a predetermined distance, on a flat substrate, manufacturing guide grooves spaced apart from each other by the same distance as that by which the guide rails for alignment are spaced apart from each other and having a concavo-convex relationship with the guide rails, on the optical fiber array device, manufacturing guide grooves for alignment spaced apart from each other by the same distance as that by which the guide rails for alignment are spaced apart from each other and having a concavo-convex relationship with the guide rails, and putting the optical fiber guide grooves and the optical waveguide guide grooves onto the guide rail formed on the flat substrate and combining them with each other.

BRIEF DESCRIPTION OF THE DRAWING(S)

The above objective(s) and advantage(s) of the present invention will become more apparent by describing in detail a preferred embodiment thereof with reference to the attached drawing(s) in which.

DESCRIPTION OF THE PREFERRED EMBODIMENT(S)

Hereinafter, a preferred embodiment of the present invention will be described in detail with reference to the attached drawings.

Figure 1:
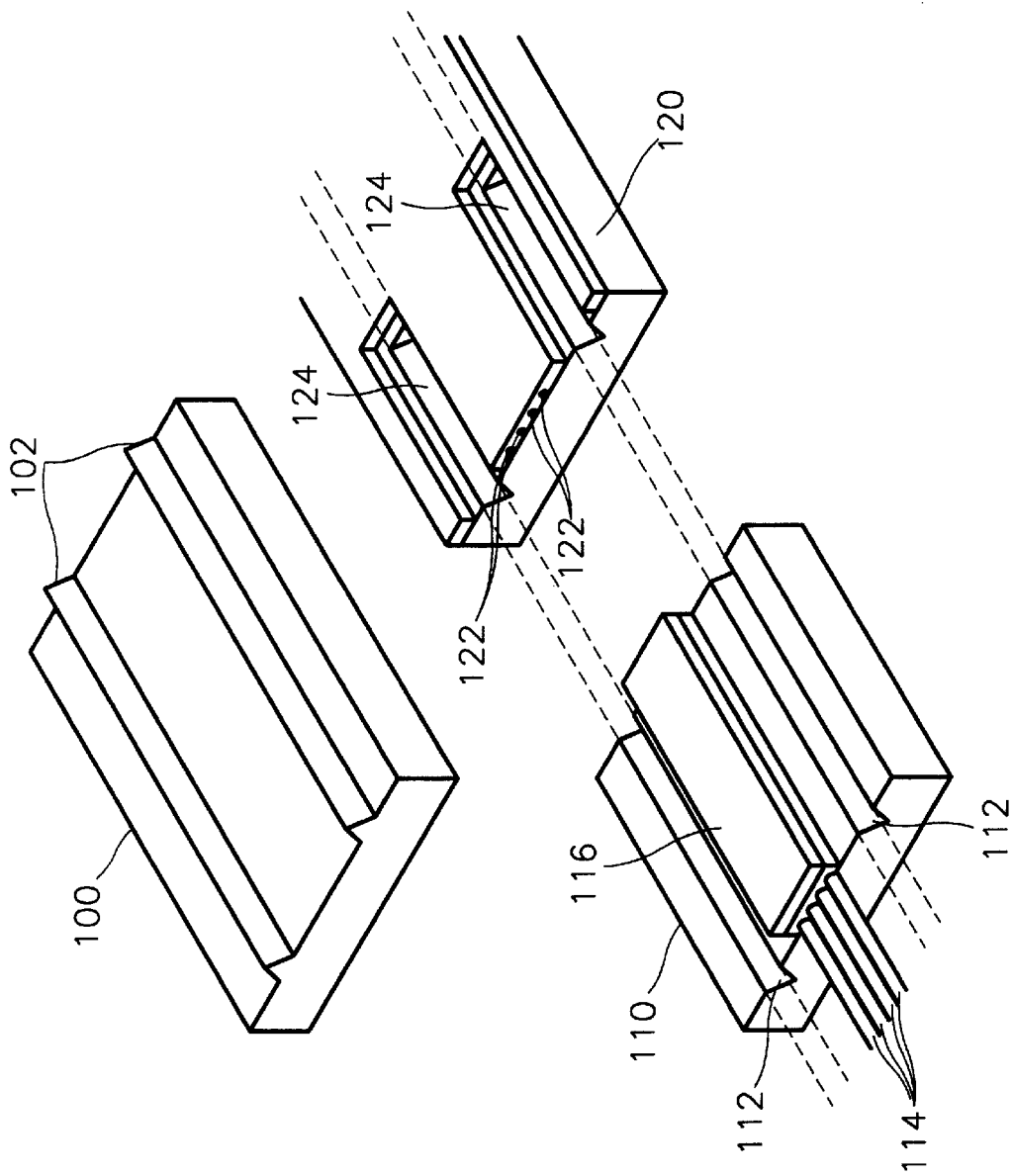
FIG. 1 shows the structure of an embodiment of an apparatus for combining optical fibers with an optical waveguide according to the present invention.

FIG. 1 is a block diagram showing the structure of an embodiment of an apparatus for combining optical fibers with an optical waveguide according to the present invention. The apparatus includes a guide rail portion 100, an optical fiber array portion 110 having a guide groove for alignment 112, and an optical waveguide device chip 120 having a guide groove for alignment 124.

The guide rail portion 100 includes guide rails 102 for alignment, spaced apart from each other by a predetermined distance, on a flat substrate. As shown in FIG. 1, two rails manufactured to be convex on a silicon substrate are spaced from each other by a predetermined distance.

In a preferred embodiment of manufacturing the guide rail 102, a strip pattern is formed of $SiO_2$ or $Si_3N_4$ to have an appropriate width, in a portion of a silicon substrate in which a convex rail will be formed, by photolithography, and the strip pattern is wet-etched in KOH solution. This method is generally used for manufacturing silicon V-shaped grooves 130 for aligning optical fibers spaced apart from each other by a certain distance in an array pattern. At this time, it is possible to obtain a cross-section of the guide rail portion having the shape shown in FIGS. 3A or 3B when a Si (100)-crystallographic plane surface substrate surface and an anisotropic etching characteristic is used. It is possible to manufacture a guide rail portion formed of various materials using a precise machining process or a precise mold other than this method. Also, the section of the guide rail 102 may have various shapes, including the ones shown in FIGS. 3A through 3D.

The optical fiber array portion 110 includes guide grooves 112 spaced apart from each other by the same distance as the distance by which the guide rails 102 of the guide rail portion 100 are spaced apart from each other, and an array of V-shaped grooves 130 for arranging several optical fibers 114 spaced apart from each other by a certain distance, in an array pattern. The optical fiber array 114 is fixed by putting the optical fiber array 114 in the V-shaped grooves 130, coating an optical glue 118 thereon, and covering it with a plate 116 for fixing or welding the optical fibers. The guide grooves for alignment 112 are formed to an appropriate depth, spaced apart from each other by the same distance as the distance by which the two rails of the guide rail portion 100 are spaced apart from each other, to the left and right of the V-shaped groove array for supporting the optical fibers.

In a preferred embodiment of manufacturing the optical array portion 110 having the guide groove 112 for alignment, an Si crystal substrate is used. $SiO_2$ or $Si_3N_4$ formed on an Si substrate (100)-plane surface to have a thin film shape is removed in a strip pattern shape to have an appropriate width by photolithography. In such a method, it is possible to simultaneously manufacture a V-shaped groove array for supporting the optical fibers 114 and the guide groove for alignment 112. When the depth of the guide groove for alignment 112 is different from that of the V-shaped groove for supporting the optical fibers, the guide groove for alignment 112 and the V-shaped groove for supporting the optical fibers can be manufactured by two similar processes.

In general, the cladding diameter of the optical fibers 114 is 125 $\mu$m and the distance by which the V-shaped grooves for supporting the optical fibers are spaced apart from each other is 250 $\mu$m. The optical fibers are fixed by putting the optical fibers 114 into the V-shaped grooves for supporting the optical fibers, coating the optical glue 118 thereon, and covering it with the plate 116 for fixing the optical fibers.

The section of the optical fiber array portion 110 is abraded enough so as to minimize combination loss when the optical waveguide array 122 of the optical waveguide device chip is combined with to the optical fiber array 114. It is possible to manufacture the optical fiber array portion 110 having the guide grooves 112 for alignment of various materials, using a precise mechanical process or a precise mold other than such a method. Also, the guide groove for alignment 112 may have various shapes, including the ones shown in FIGS. 4A through 4D.

The optical waveguide device chip 120 is a general optical waveguide device and includes an optical waveguide array 122 connected to the optical fiber array 114 of the optical fiber array portion 110 and concave guide grooves for alignment 124 of an appropriate depth and spaced apart by the same distance as that by which the two guide rails 102 of the guide rail portion 100 are spaced apart from each other, to the left and right of the optical waveguide array 122, after manufacturing a device.

In a preferred embodiment of manufacturing the optical waveguide device chip 120 having the guide groove 124 for alignment, a silica layer which becomes lower cladding is formed on a silicon substrate by flame hydrolysis deposition (FHD). A silica layer, which becomes a core, is formed to have a refractive index higher than that of the cladding layer, is formed by FHD. A channel shaped optical waveguide is manufactured using a photolithography process and a reactive ion etching (RIE). At this time, the distance between optical waveguides array 122 is the same as the distance between the V-shaped grooves for supporting the optical fibers in the optical fiber array portion 110, namely, the distance between the optical fibers 114. In general, the distance is 250 μm. The fabrication of the optical waveguide device is completed by forming an upper cladding silica layer by FHD.

Figure 3A:
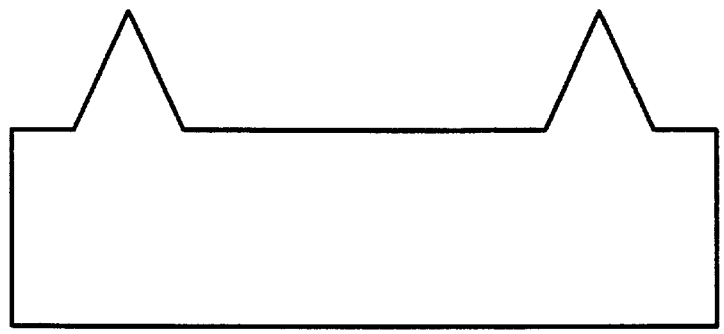
FIGS. 3A through 3D are sectional views showing examples of the shapes of various transformed guide rails for alignment.
Figure 3B:
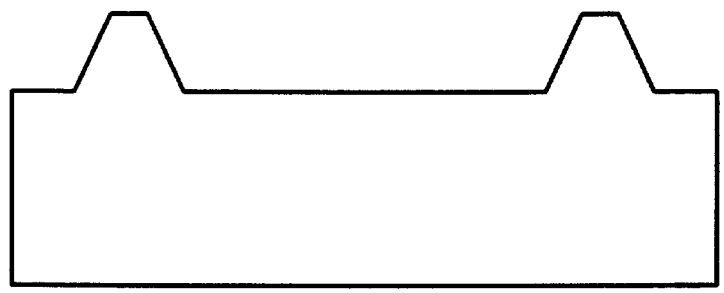
Figure 3C:
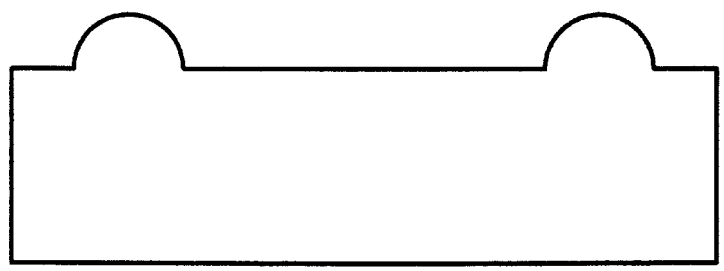
Figure 3D:
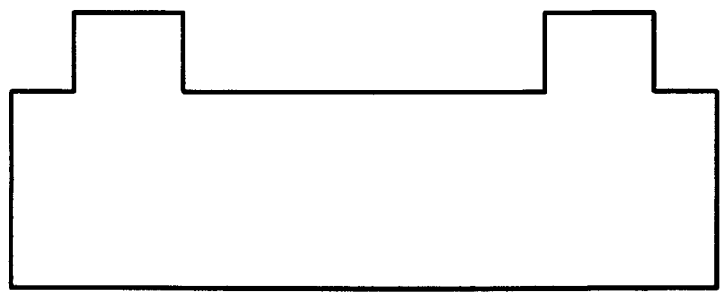
Figure 4A:
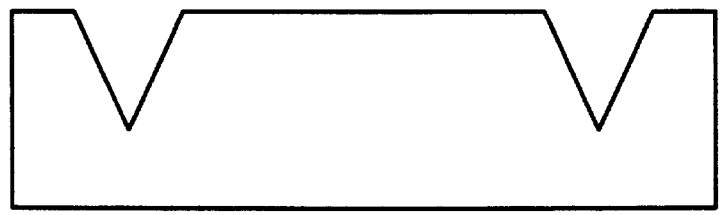
FIGS. 4A through 4D are sectional views showing examples of the shapes of various transformed guide rails for alignment.
Figure 4B:
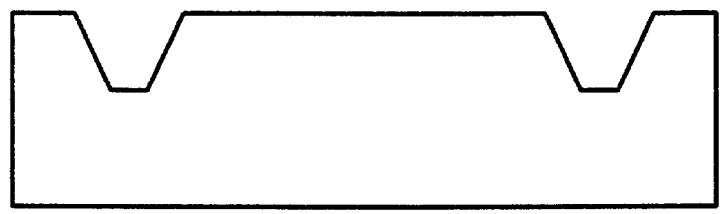
Figure 4C:
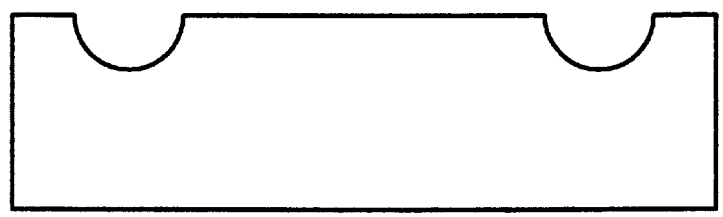
Figure 4D:
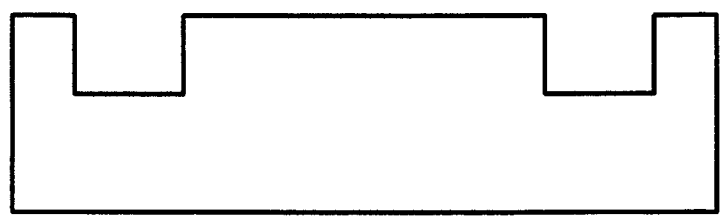
Figure 5A:
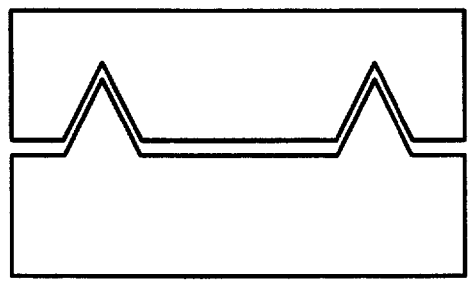
FIGS. 5A through 5G show examples of possible combinations of sectional shapes when the guide rail for alignment is combined with the guide groove.
Figure 5B:
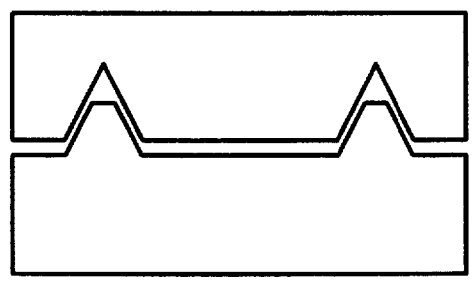
Figure 5C:
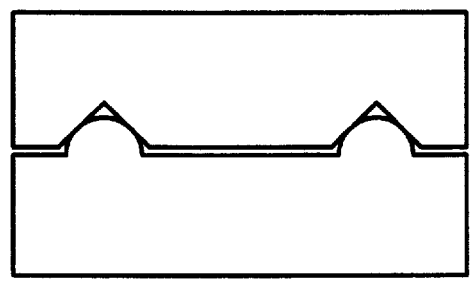
Figure 5D:
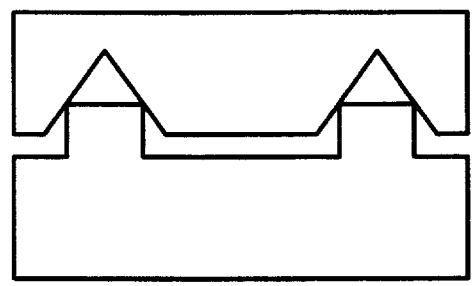
Figure 5E:
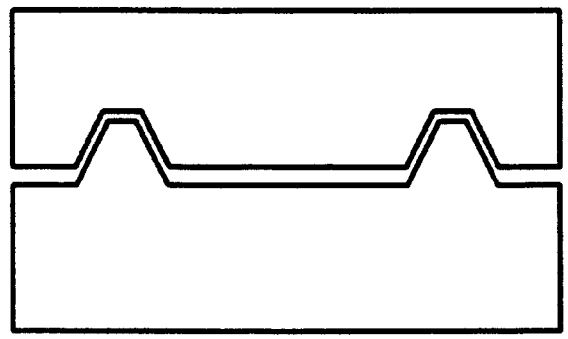
Figure 5F:
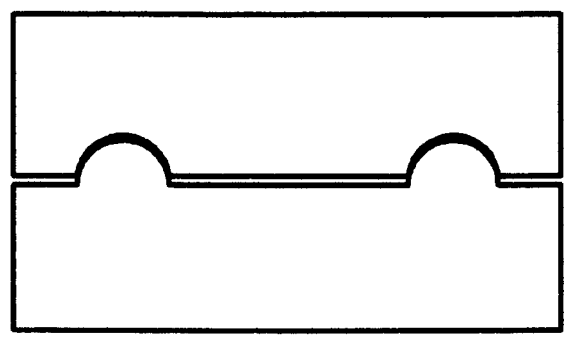
Figure 5G:
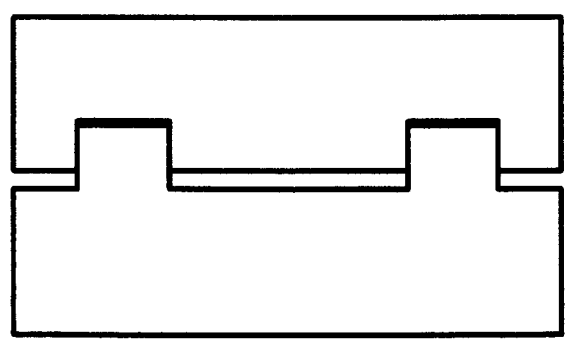

The guide grooves 124 for alignment are manufactured in the KOH solution using a anisotropic etching characteristic of an Si crystal surface after the Si substrate is revealed by removing the silica layer to have an appropriate width in an appropriate position from the input and output optical waveguide array 122 on the optical waveguide device chip 120, by photolithography. At this time, the positions of the two guide grooves 124 coincide with the positions of the two guide rails 102 of the guide rail portion 100. The distances from the input and output optical waveguides 122 to the guide grooves for alignment 124 coincide with the distances from the guide groove 112 to the optical fiber array 114, in the optical fiber array portion 110. The combination of the guide rail 102 of the guide rail portion 100 with the guide grooves for alignment 124 is not disturbed by removing the silica layer around the guide grooves for alignment 124. The shapes of the manufactured guide grooves 124 for alignment are shown in FIGS. 3A and 3B.

The section of the optical waveguide chip 120 is abraded enough so as to minimize combination loss when the input and output optical waveguide array 122 of the optical waveguide device is combined with the optical fiber array 114. The guide grooves for alignment 124 can be manufactured to have the shapes shown in FIGS. 3A and 3B.

The guide grooves for alignment 124 can be manufactured over some part or all of the waveguide chip, in a longitudinal direction, on the optical waveguide device chip 120. Also, the fabrication of the optical waveguide device chip 120 having the guide grooves for alignment 124 can be applied to various waveguide devices such as a polymer optical waveguide, a glass optical waveguide, and a lithiumniobate (LiNbO₃), as well as the silica waveguide. It is possible to manufacture guide grooves for alignment 124 on the optical waveguide chip using a dry etching method such as RIE or a precise machining process, other than this method. Also, the guide grooves for alignment 124 may have various shapes, including the ones shown in FIGS. 4A through 4D.

Figure 2A:
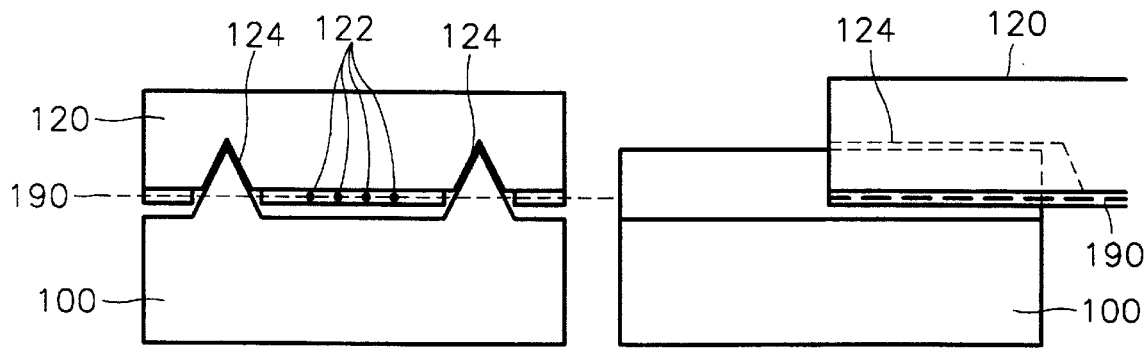
FIG. 2A is a front view and a side view of a state in which an optical waveguide device chip having guide grooves is combined to a guide rail for alignment according to a preferred embodiment of the present invention.
Figure 2B:
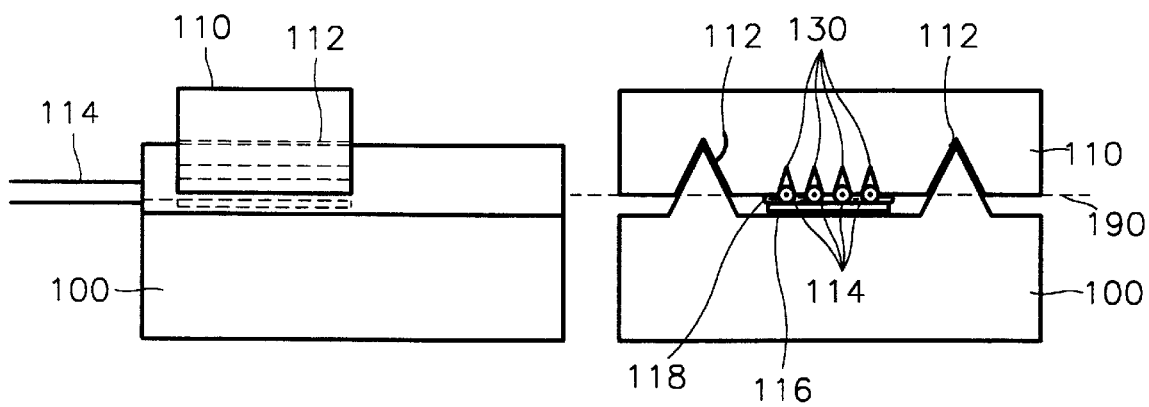
FIG. 2B is a side view and a front view of a state in which an optical fiber array portion having a guide groove for alignment is combined to a guide rail for alignment according to a preferred embodiment of the present invention.
Figure 2C:
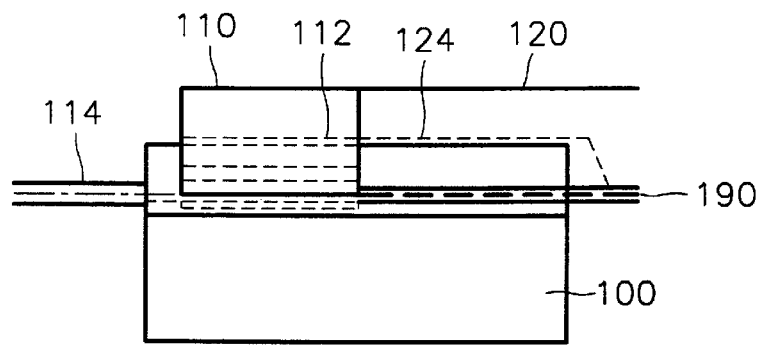
FIG. 2C is a side view showing a state in which an optical waveguide device chip and an optical fiber array portion having guide grooves are aligned on and combined with a guide rail for alignment according to a preferred embodiment of the present invention.

The passive alignment method of the optical fibers and the optical waveguide is performed by the combination of the structural elements. FIG. 2A is a front view and a side view of a state in which the optical waveguide device chip 120 having the guide grooves for alignment 124 is put onto the guide rail portion 100, according to a preferred embodiment of the present invention. FIG. 2B shows a side view and a front view of a state in which the optical fiber array portion 110 and the optical waveguide device chip 120 are put onto the guide rail portion 100, according to a preferred embodiment of the present invention, and are combined with each other. FIG. 2C is a side view showing a state in which the optical waveguide device chip and the optical fiber array portion having the guide grooves are aligned on the guide rail for alignment according to a preferred embodiment of the present invention and are combined to each other.

In such a state, vertical and lateral positions of the cores of the optical fibers of optical fiber array 114 coincide with vertical and lateral positions of the core of the optical waveguide 122. The lateral positions are automatically aligned by putting the optical fiber array portion 110 and the optical waveguide device chip 120 on the guide rail 102 of the guide rail portion 100 so that the guide grooves 112 of the optical fiber array portion 110 coincide with the guide grooves 124 of the optical waveguide device chip 120 since the relative position between the guide grooves 112 of the optical fiber array portion 110 and the optical fiber array 114 coincides with the relative position between the guide grooves 124 of the optical waveguide device chip 120 and the optical waveguide array 122.

The vertical positions are naturally aligned by making the cores of the optical fibers of optical fiber array 114 coincide with those of the optical waveguide array 122 on a vertical base line 190 when the optical fiber array portion 110 and the optical waveguide device chip 120 are put on the guide rail of the guide rail portion 100, after controlling the depth of the guide groove 112 of the optical fiber array portion 110 and that of the guide groove 124 of the optical waveguide device chip 120.

The optical fiber array portion 110 and the optical waveguide device chip 120 are permanently combined with each other using an optical glue or by welding them after depositing a metal on the back surfaces of the optical fiber array portion 110 and the optical waveguide device chip 120.

FIGS. 5A through 5H show several examples of the combination of section shapes when the guide rail portion 100 is combined with the guide grooves 112 or 124. Other than these, the present invention can be realized by various combinations.

In the present invention, the guide rails for alignment are used in order to easily realize the combination of the optical fibers with the optical waveguide by the passive alignment method. Also, the optical fibers are combined with the optical waveguide by forming the guide grooves on the optical fiber array portion and the optical waveguide device chip and by combining the guide rails with the guide grooves.

According to the present invention, the light source and the photodetector required for active alignment are not necessary. A complicated process of performing the alignment with submicron precision is not necessary. Also, it is possible to save time and money when attaching the optical fibers to the optical waveguide device chip.

What is claimed is:

1. An apparatus for combining optical fibers with an optical waveguide device, comprising:

a guide rail portion including guide rails spaced apart from each other by a predetermined distance, on a flat substrate, for alignment of parts of the apparatus;

an optical fiber array portion put on the guide rail portion when the optical fibers are combined with the optical waveguide device, including an array of grooves for arranging the optical fibers spaced apart from each other by a predetermined distance in an array pattern, optical glue mounting the optical fibers to the array of grooves, and a plate covering the optical fibers, and said optical fiber array portion further including guide grooves having a concavo-convex relationship with the guide rail portion, the guide grooves of the optical fiber array portion being on the same side of the optical fiber array portion as the array of grooves; and an optical waveguide device chip put on the guide rail portion when the optical fibers are combined with the optical waveguide, including the optical waveguide connected to the optical fibers of the optical fiber array portion, and including guide grooves spaced apart from each other by the same distance as that by which the guide rails of the guide rail portion are spaced apart from each other and having a concavo-convex relationship with the guide rail portion, to the outside of an optical waveguide area in which the cores of the optical fibers of the optical fiber array portion respectively coincide with those of the optical waveguide.

2. The apparatus of claim 1, wherein the guide rail portion comprises two guide rails spaced apart from each other by a certain distance, manufactured to be convex, on a plane.

3. The apparatus of claim 2, wherein the shape of the section of the guide rail is one selected from among a triangle, a square, a semi-circle, and a trapezoid.

4. The apparatus of claim 1, wherein the guide rail of the guide rail portion, the guide grooves of the optical fiber array portion, and the guide grooves of the optical waveguide device chip are manufactured by a method selected from among etching a silicon substrate, a machining process, and a molding process.

5. The apparatus of claim 1, wherein the optical fibers are fixed to the array of grooves of the optical fiber array portion by putting the optical fibers on the array of grooves, coating the optical glue thereon, and attaching the plate for fixing the optical fibers.

6. The apparatus of claim 1, wherein the guide grooves of the optical waveguide device chip are manufactured in a longitudinal direction over some part or all of the optical waveguide device chip on the optical waveguide device chip.

7. The apparatus of claim 1, wherein the optical waveguide device chip is manufactured of a material selected from among the group consisting of a silica optical waveguide, a polymer optical waveguide, a glass optical waveguide, and a lithium niobate (LiNbO3) optical waveguide.

8. The apparatus of claim 1, wherein the lateral positions of the cores of the optical fibers and the optical waveguide are aligned by the positions of the optical fiber array portion and the guide grooves on the optical waveguide device chip in relation to the optical fibers and the optical waveguide when the optical fiber array portion is combined with the optical waveguide device chip on the guide rails for alignment.

9. The apparatus of claim 1, wherein the vertical positions of the cores of the optical fibers of the optical fiber array portion and the cores of the optical waveguide of the optical waveguide device chip are aligned by controlling the depth of the guide grooves for alignment when the optical fiber array portion is combined with the optical waveguide device chip on the guide rails for alignment.

10. The apparatus of claim 1, wherein the optical fiber array portion and the optical waveguide device chip, combined with each other on the guide rail of the guide rail portion for alignment, are fixed together by an optical glue or by welding.

11. The apparatus of claim 1, wherein the section of the guide rail of the guide rail portion for alignment is combined with the guide groove on the optical fiber array portion and the optical waveguide device chip in a state in which the guide rail and the guide groove have the same concavo-convex shape or different concavo-convex shape.

12. The apparatus of claim 1, further comprising:
said optical fiber array guide grooves having a different depth than said optical waveguide device chip guide grooves, for adjusting the relative vertical positions of the optical fiber array and the optical waveguide.

13. A method for combining optical fibers with an optical waveguide, comprising the steps of:

manufacturing guide rails spaced apart from each other by a predetermined distance, on a flat substrate;

manufacturing guide grooves spaced apart from each other by the same distance as that by which the guide rails for alignment are spaced apart from each other and having a concavo-convex relationship with the guide rails, on an optical fiber array device;

manufacturing an array of grooves in between guide grooves of the optical fiber array device, putting optical fibers in the array of grooves, coating an optical glue on the optical fibers, and covering the glue and the optical fibers with a plate for fixing the optical fibers;

manufacturing guide grooves spaced apart from each other by the same distance as that by which the guide rails for alignment are spaced apart from each other and having a concavo-convex relationship with the guide rails, on an optical waveguide device chip; and putting the optical fiber array device guide grooves onto a portion of the guide rails, putting the optical waveguide guide grooves onto the guide rails, and combining the optical fiber array device with the optical waveguide device chip.

14. An apparatus for combining optical fibers with an optical waveguide device, comprising:

a guide rail portion for alignment of parts of the apparatus, said guide rail portion comprising:
a flat surface; and
two guide rails formed in parallel and spaced by a first distance on said flat surface;

an optical fiber array portion, comprising:
two optical fiber array guide grooves formed in parallel and spaced by said first distance on a side of the optical fiber array portion, for mating with said guide rails;
a V-groove array formed on the same side as and parallel to and between the optical fiber array guide grooves; and
an optical fiber array formed of optical fibers disposed in the V-groove array;
optical glue mounting the optical fibers to the V-groove array; and
a plate covering the optical fibers; and an optical waveguide device chip, comprising:
two optical waveguide device chip guide grooves formed on a side of the optical waveguide device chip; and
an optical waveguide array formed on the same side as and parallel to and between the optical waveguide device chip guide grooves, for joining with the optical fiber array.

15. The apparatus of claim 14, further comprising:
there being exactly two guide rails, two optical fiber array guide grooves and two optical waveguide device guide grooves.

16. The apparatus of claim 14, further comprising:
the optical waveguide device chip guide grooves terminating in a middle portion of the optical waveguide device chip.

17. The apparatus of claim 14, further comprising:

said flat surface being formed of a silicon (100) crystallographic plane.

18. The apparatus of claim 17, further comprising:

said guide rails being formed of $SiO_2$ or $Si_3N_4$.

19. The apparatus of claim 14, further comprising:

said optical fiber array portion and optical waveguide device chip mounted to the guide rail portion with the optical fiber array joined to the optical waveguide array and the guide rails disposed in the optical fiber array guide grooves and optical waveguide device chip guide grooves.

20. The apparatus of claim 19, further comprising:

optical glue between the optical waveguide device chip and optical fiber array portion, for making a permanent combination.

21. The apparatus of claim 19, further comprising:

metal deposited on back surfaces of the optical fiber array portion and the optical waveguide device chip, for forming a weld.

* * * * *